Feb. 23, 1943.   E. W. SIEGLING   2,311,783
METHOD OF FABRICATING PISTON RINGS
Original Filed March 7, 1940   2 Sheets-Sheet 2
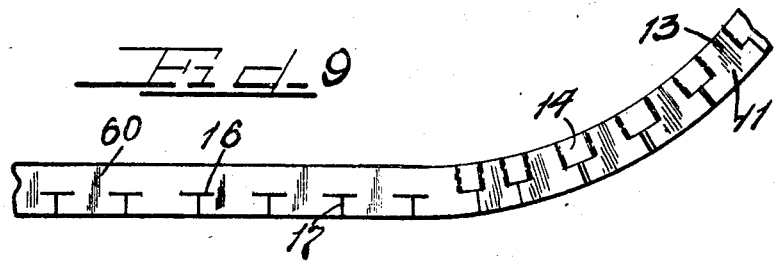
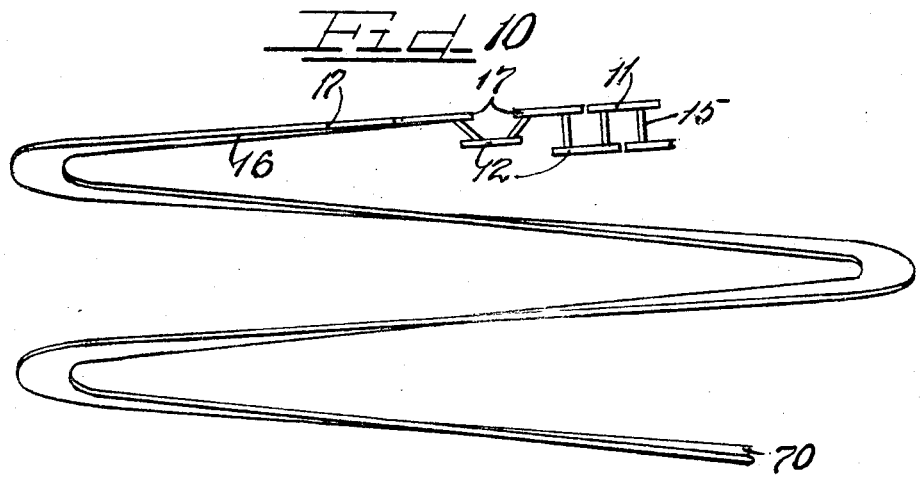
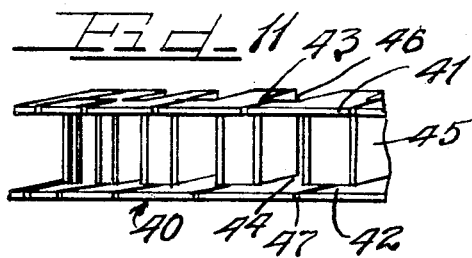
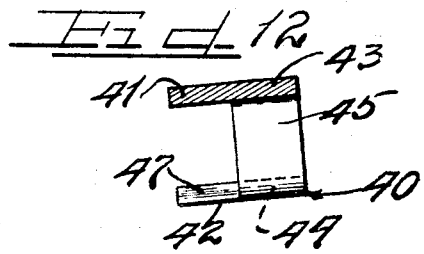
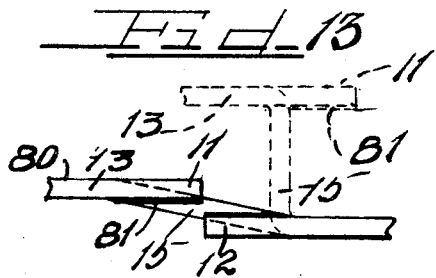
Inventor
Elmer W. Siegling.

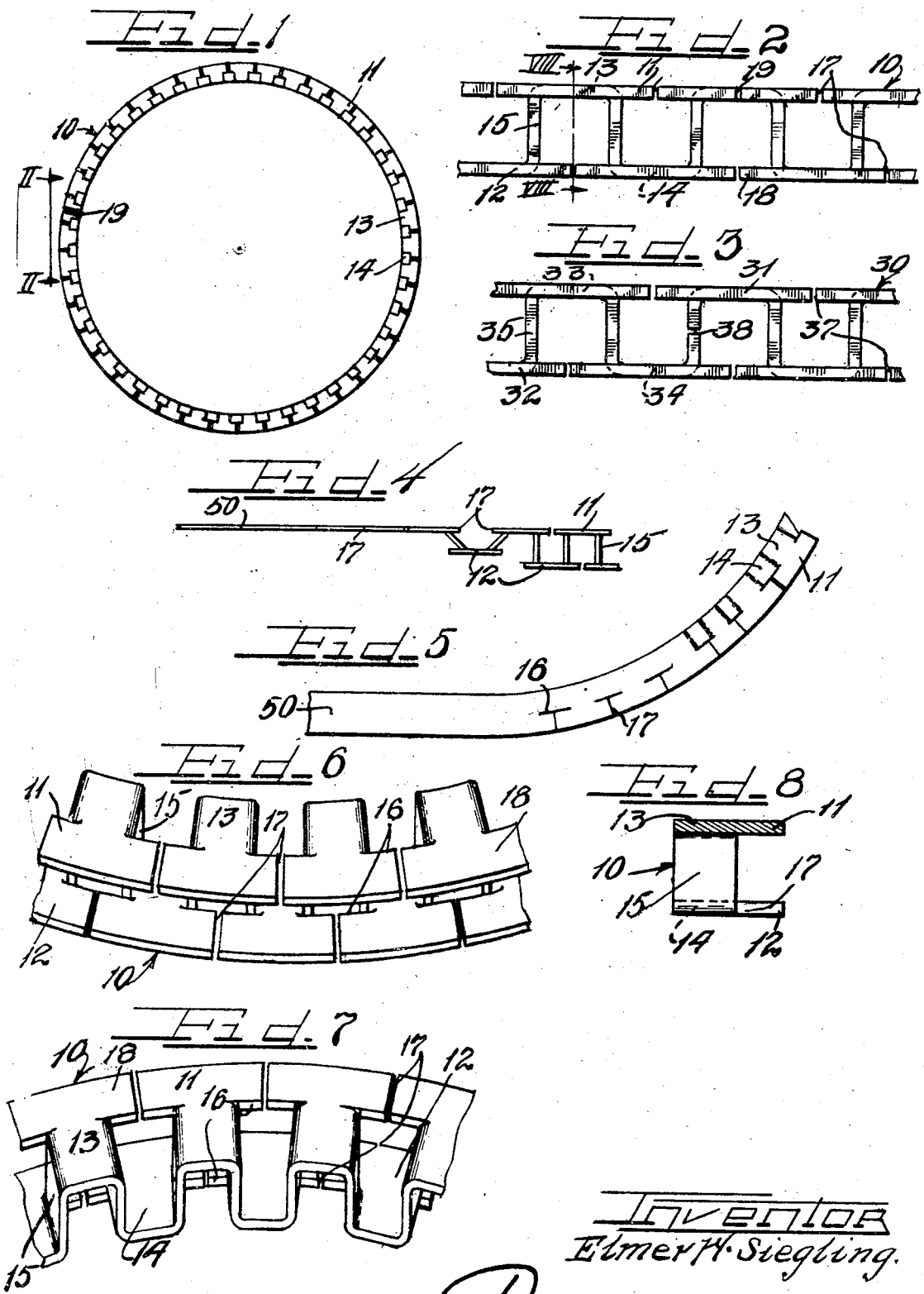

Patented Feb. 23, 1943

2,311,783

UNITED STATES PATENT OFFICE 2,311,783

METHOD OF FABRICATING PISTON RINGS

Elmer W. Siegling, Cleveland, Ohio, assignor, by mesne assignments, to Power Research Corporation, Boston, Mass., a corporation of Massachusetts Original application March 7, 1940, Serial No. 322,746. Divided and this application September 9, 1940, Serial No. 355,922

7 Claims. (Cl. 29—156.6)

This application is a division of my pending application entitled "Flexible piston ring," Serial No. 322,746, filed March 7, 1940. The invention disclosed in the present application relates to methods of fabricating piston rings. More particularly, the invention relates to methods of making circumferentially resilient piston rings having spaced upper and lower cylinder wall engaging edges formed by two series of annularly aligned ring-segments joined by a corrugated annular strip of resilient sheet metal.

It has heretofore been proposed to fabricate circumferentially compressible piston rings having radially disposed tubular oil passages in three different manners, viz: from a single corrugated metal strip; from a plurality of individual tubes secured together radially; and from two matching corrugated metal strips superimposed axially and welded together.

The present invention departs radically from the prior art by providing methods of making circumferentially and axially resilient piston rings comprising two similar series of outer, winged ring-segments of resilient sheet metal annularly aligned in spaced planes at the same distance from a common axis together with an inner corrugated annular strip of resilient sheet metal extending between said planes and holding said segments in aligned relationship. The large radial openings through such piston rings permit passage of oil therethrough even more freely than the tubular radial oil passages of the prior art rings. At the same time the large openings through the rings according to the present invention do not become clogged with carbon deposits as do the tubular passages of the prior art rings.

Such rings may be fabricated by bending a strip of resilient sheet metal into a helix having two flat superimposed turns, cutting spaced circumferentially aligned slots through said strip intermediate the edges thereof, cutting radial slots through said strip extending from the outer periphery thereof into communication with said circumferential slots, and corrugating the inner uncut portion of said strip to decrease the length of the bent strip into a single turn.

It is therefore an important object of the present invention to provide methods of fabricating axially and circumferentially resilient piston rings having spaced upper and lower edges for engaging the wall of a cylinder and characterized by large radial openings therethrough always open for free passage of oil between the two peripheral faces of the rings.

Another important object of this invention is to provide methods of making piston rings comprising two similar series of outer, winged ring-segments of resilient sheet metal annularly aligned in spaced planes at the same distance from a common axis together with a corrugated annular strip of resilient sheet metal extending between said planes and holding said segments in aligned relationship in said planes.

A further important object of this invention is to provide a method of fabricating the novel rings of this invention involving bending a strip of resilient sheet metal into a helix having two flat superimposed turns, cutting spaced circumferentially aligned slots through said strip intermediate the edges thereof, cutting radial slots through said strip extending from the outer periphery thereof into communication with said circumferential slots, and corrugating the inner uncut portion of said strip to decrease the length of the bent strip into a single turn.

Other and further objects of this invention will become apparent from the disclosures in the specification and the accompanying drawings.

This invention (in a preferred form) is illustrated in the drawings and hereinafter more fully described.

In the drawings:

Figure 1 is a top plan view of a split ring made according to the present invention.

Figure 2 is a greatly enlarged outside view of the split portion of the ring taken along the line II—II of Figure 1.

Figure 3 is a greatly enlarged fragmentary side view of a modified split arrangement for a ring otherwise similar to the ring of Figure 1.

Figure 4 is a fragmentary enlarged side view of a strip of metal illustrating an intermediate stage of fabrication of the ring of Figure 1.

Figure 5 is a top plan view of the structure shown in Figure 4.

Figure 6 is a greatly enlarged fragmentary perspective view of the outer face of the ring of Figure 1.

Figure 7 is a greatly enlarged perspective view from the inside of a portion of the ring of Figure 1.

Figure 8 is a cross-sectional view along the line VIII—VIII of Figure 2.

Figure 9 is a fragmentary enlarged top plan view of a strip of metal illustrating an intermediate stage of fabrication of the ring of Figure 1 by a modification of the method illustrated in Figures 4 and 5.

Figure 10 is a fragmentary enlarged side view of a strip of metal illustrating an intermediate state of fabrication of the ring of Figure 1 by yet another modification of the method illustrated in Figures 4 and 5.

Figure 11 is a greatly enlarged fragmentary perspective view of a dished piston ring made according to the principles of the present invention.

Figure 12 is a greatly enlarged cross-sectional view through the ring of Figure 11.

Figure 13 is a greatly enlarged fragmentary side view of successive stages in the corrugating step in the fabrication of the ring of Figure 1 from a metal strip which has been slotted in a prior shearing operation.

As shown on the drawings:

In Figures 1, 2, 6, 7 and 8 the reference numeral 10 indicates generally a piston ring made according to the principles of the present invention. This ring comprises an annular strip of resilient sheet metal slotted and corrugated to form winged upper ring-segments 11 annularly aligned on the outside of the ring and similarly aligned winged lower ring-segments 12. The segments 11 and 12 are held in closely spaced aligned relationship by an inner annular corrugated portion comprising crests 13, bottoms 14 and intermediate vertical portions 15.

As best shown in Figures 6 and 7, the ring 10 is pierced by a series of spaced circumferentially aligned slots 16 serving to separate the two wings 18 of each of the ring-segments 11 and 12 from the inner corrugated portion of the ring 10, the other parts of the ring-segments being continuous with the inner corrugated portion. The ring-segments 11 and 12 are separated from each other by radial slots 17 equal in number to the circumferential slots 16, piercing the outer periphery of the ring 10 and communicating with the slots 16 to form T's therewith.

More particularly, the crests 13 and bottoms 14 of the inner corrugations extend intermediate the spaced circumferential slots 16. The vertical portions 15 of the corrugations are coextensive with the slots 16. In other words, the radial corners of the corrugations fall at the ends of the slots 16. Consequently the outside of each slot 16 which is pierced by a radial slot 17 is divided between the wings of paired upper segments 11 and lower segments 12 interconnected by one vertical segment 15. Similarly the two opposed sides of each radial slot 17 are divided between the wings of pairs of upper and lower ring-segments, so that in each of the T's formed in the finished ring 10 by the slots 16 and 17 one pair of adjacent circumferential slots 16 contributes jointly the adjacent parts of the outsides of the slots to form the crossing members of the T's while the two radial slots 17 communicating with the paired circumferential slots 17 contribute jointly their two opposed sides to form the shanks of the T's. This is possible because the upper segments 11 overlap the lower segments 12, as shown in Figure 2, the overlapping portions of pairs of upper segments 11 and lower segments 12 interconnected by one vertical wall portion 15 being separated from the corrugated inner portion by one circumferential slot 16. The members of each such pair of segments are separated from each other by one radial slot 17.

The above disclosed slotting and corrugation of the annular strip of resilient sheet metal of the ring 10 yields spaced upper and lower edges for engaging the walls of a cylinder composed of two series of annularly aligned closely spaced winged ring-segments. Each segment at one level is connected to two therewith overlapping segments at the other level by two opposed, adjacent vertical wall portions 15 of the inner corrugation which thus serve as cross-over segments.

The ring 10 may therefore be described as having upper and lower faces in spaced superimposed relationship, each of said faces comprising a plurality of T-shaped members. The legs of these members are formed by the crests 13 or bottoms 14 and the heads by the ring segments 11 and 12, with the wings 18 projecting laterally. The T-shaped members in one face are staggered with reference to the members of the other face. The legs of the members project radially inward in spaced relationship to each other while the heads are annularly aligned in two planes to define spaced wearing edges for the ring. Intermediate wall members represented by the vertical segments 15 extend between the legs of the staggered T-shaped members to hold the members together.

As shown in Figures 1 and 2, the ring 10 may be split as at 19 by a radial slot traversing both a crest 13 and the upper ring-segment 11 attached thereto.

Rings made according to the present invention may be split anywhere in their circumference as long as the surfaces generated by the split are not prevented from abutting on each other. Figure 3 illustrates a ring made according to this invention generally indicated by the reference numeral 30 and comprising upper ring segments 31, lower ring-segments 32, inner corrugations having crests 33, bottoms 34 and vertical cross-over segments 35, circumferential slots (not shown) and radial slots 37 all similar to the corresponding features of the ring shown in Figures 1 and 2. However, the ring 30 is split at 38 by a radial slot traversing a cross-over segment 35 of the inner corrugation.

Many other modifications of the ring 10 are possible.

Figures 11 and 12 illustrate a ring made according to this invention generally indicated by the reference numeral 40 and comprising upper ring-segments 41, lower ring-segments 42, corrugations having crests 43, bottoms 44 and cross-over segments 45, circumferential slots 46 and radial slots 47, all similar to the corresponding features of the ring of Figures 1 and 2 except that the ring-segments 41 and 42, the crests 43 and the bottoms 44 form the same slight angle with the plane of the ring 40 to dish the ring.

The upper and lower ring-segments of rings made according to this invention are preferably but not necessarily aligned in parallel planes.

Other possible variations include rings in which the radial slots enter the circumferential slots at the ends of the latter to form L's therewith. In such rings each ring-segment has only one wing, but this wing is twice as long as the rings 18 of the ring 10.

The interspaces between the circumferential slots may also be made relatively long and the corners of the corrugations may be disposed in these interspaces rather than at the ends of the circumferential slots. Rings so constructed will have wearing edges spaced from the upper and lower faces of the rings which will be corrugated rather than flat.

The curvature of the inner corrugations may be varied by regulating the length of the circumferential slots. One suitable length for the latter is about one-half of the radial thickness of the ring, the interspaces between the slots being of the same length as the slots. The circumferential slots need not be located exactly halfway between the inner and outer peripheries of the rings.

The distance between the upper and lower ring-segments is a function of the curvature of the inner corrugated portion whose length is equal to the combined lengths of the upper and lower ring-segments.

The edges of the rings engaging the cylinders may be rounded or have sharp corners.

The sheet metal of the rings is preferably between 0.020 and 0.030 of an inch thick. The gaps between the wings 18 suitably amount to about 0.003 to 0.005 of an inch.

Rings made according to this invention are circumferentially compressible, the cross-over segments such as those indicated by the reference numeral 16 flexing and the wings 18 approaching each other to take up the gaps therebetween. When so compressed, the rings exert a circumferential spring action tending to expand the rings radially. This spring action is distributed uniformly over the peripheries of the rings.

The rings are made with peripheries slightly larger than the peripheries of the cylinders in which the rings are to be installed. On installation the rings are compressed to an extent such as to leave between the wings 18 only the minute gaps necessary to take care of expansion due to heat and other irregularities. Such minute gaps are small enough to prevent the leaking therethrough of any appreciable amounts of oil. The outer sealing surfaces of the rings are therefore practically continuous.

The compressed installed rings tend to expand against the cylinder walls so as to bear uniformly against the latter and to adapt themselves to any irregularities therein. This uniform expansive spring action is maintained permanently, for the cross-over segments to whose flexion the circumferential spring action is due to not contact the cylinder walls and are consequently not exposed to mechanical wear.

The two edges of the rings engaging the cylinder walls provide cylinder engaging surfaces particularly well adapted to remove excess oil from the cylinder walls. The large openings between the contact surfaces of the rings and through the corrugations permit free drainage of oil therethrough. These openings will further not become clogged by carbon deposits.

Other advantages inherent in rings made according to the present invention will be discussed in connection with the hereinbelow following disclosure of methods for fabricating the rings.

Figures 4 and 5 illustrate one method of fabricating the rings of the present invention. As shown, a strip 50 of sheet metal having a width equal to the radial width of the ring to be made is bent annularly in its own plane to a radius equal to the radius of the cylinder in which the ring is to be installed. A helix comprising slightly less than two such circles is required for each ring.

This initial bending operation gives the required outer curvature to the ring-segments of the finished rings, thus saving any otherwise necessary grinding of the peripheries of the finished rings. Or, to put the matter in different words, the desired shape of the wearing surfaces may be conferred on the strip of sheet metal in the first fabricating operation, this shape remaining intact during subsequent fabricating operations, so that each ring-segment in the finished rings will exactly fit the cylinder bores for which the rings are intended.

In the fabrication of rings having rounded wearing surfaces, the edge of the strip that is to form the wearing surfaces is most suitably rounded prior to the bending operation.

The fabrication of the rings is then continued by a slotting and forming operation. Circumferential slots 16 and radial slots 17 crossing to form T's are cut in the annularly bent strip which is then bent to approximately right angles at the ends of the circumferential slots 16. Figure 4 shows how the forming operation shortens the helically bent strip into a circle, alternate ring segments being aligned annularly at two levels with successive segments overlapping.

An alternate method of fabricating the rings of the present invention is illustrated in Figure 9. A strip of metal 60 is first cut and formed and the slotted and corrugated strip is subsequently bent into annular shape. Such a method yields rings whose outer peripheries would not be perfectly circular so that the rings would have to be ground or machined round. Further, gaps between the rings would tend to gape outwardly in contrast to the radial slots cut in previously bent strips which form gaps intermediate the rings which are of uniform width.

Yet another method of fabricating the ring shown in Figure 1 is illustrated in Figure 10. A strip 70 of resilient sheet metal is bent into a helix having continuous superimposed flat turns. Substantially T-shaped slots are cut in the helically bent strip. The inner portion of the strip is corrugated to decrease its length by approximately one-half, and complete turns are cut off from the thus fabricated stock.

In all these methods of fabricating the rings, the cutting of the slots is preferably accomplished by means of a shearing operation. Figure 13 represents successive stages in the corrugation of a metallic strip 80 slotted by shearing. The final stage is indicated with dotted lines. As shown, all burrs 81 formed during the shearing operation are on the inside, away from bearing surfaces, and consequently need not be removed. A cutting operation by methods other than shearing, for instance, punching or piercing leaves two burrs on the same side of the cut surface. One of these burrs will be on the outside of the corrugated ring and must therefore be removed by grinding or otherwise.

The shearing operation further leaves sharp corners at the intersection between the outer peripheries and the radial slots, no enlarged openings being left at these places which would tend to permit leakage of oil therethrough.

It is, of course, possible to fabricate the inner annular corrugated portions and the outer ring-segments separately and to attach the ring-segments to the corrugated portions in a subsequent step by welding or otherwise.

The rings are preferably made of steel but any other material having the desired wearing and mechanical properties such as resilience and capable of being machined and formed may be utilized.

After the rings have been formed they are preferably hardened by a suitable heat treatment yielding no rough scale to increase the strength and resistance to wear. The rings may also be tin plated to give better wearing surfaces.

Rings made according to this invention are thus easy and inexpensive to manufacture. The structural features of the rings comprising a radially corrugated annular strip of resilient sheet metal and a plurality of winged sheet metal ring-segments attached to or integral with the outside of the corrugated strip at the levels of the crests and bottoms of the corrugations, the ring-segments at each level being aligned annularly in closely spaced relationship, coact to confer on the rings both uniform axial and circumferential resiliency while at the same time adapting the rings for removing excess oil from cylinder walls and permitting oil thus removed to drain through the rings.

As pointed out hereinabove, various details of construction may be varied through a wide range without department from the principles of this invention and it is, therefore, not the purpose to limit the patent granted hereon otherwise than necessitated by the scope of the appended claims.

I claim as my invention:

1. A method of fabricating a piston ring comprising bending a resilient sheet metal strip having a straight edge into a helix having continuous superimposed flat turns, shearing substantially T-shaped slots in the outer portion of the bent strip to form ring segments, said T-shaped slots being of uniform size and uniformly spaced apart along the strip corrugating the inner portion of the bent strip to decrease its length, the depth of the corrugated portions of the strip corresponding to the length of the head portions of the T-shaped slots, cutting off complete turns of the thus fabricated stock and maintaining the same curvature in the helix during the corrugating.

2. A method of fabricating a packing ring comprising bending a resilient sheet metal strip having a straight edge into helical shape, shearing said bent strip at uniformly spaced-apart points therealong to form uniform radial slots in the outer portion of said strip and uniformly spaced apart circumferential slots intermediate the edges of the strip intersecting said radial slots thereby subdividing said outer portion into spaced winged ring-segments and corrugating the inner portion of said strip along folding lines which intersect the ends of the circumferential slots to align said ring-segments in closely spaced relationship in two annular rows which are spaced apart a distance substantially corresponding to the length of said circumferential slots, and maintaining the same curvature in the helix during the corrugating.

3. A method of fabricating a packing ring which comprises bending a resilient sheet metal strip having a straight edge into helical shape, forming radial slots with substantially parallel edges in the outer portion of said strip, cutting circumferential slots intermediate the edges of the strip and intersecting said radial slots, thereby dividing the outer portion of the strip into spaced segments having radial edges, then corrugating the inner portion of said strip by bending the same to form a plurality of leg portions connecting alternate upper and lower crown portions which include said segments, the distance between adjacent lines of bending being so related to the angle of bending that upper and lower segments are aligned at two levels and maintaining the same curvature in the helix during the corrugating.

4. A method of fabricating a packing ring which comprises bending a resilient sheet metal strip having a straight edge into helical shape, forming radial slots with substantially parallel edges in the outer portion of said strip, cutting circumferential slots intermediate the edges of the strip and intersecting said radial slots, thereby dividing the outer portion of the strip into spaced segments having radial edges, then corrugating the inner portion of said strip by bending the same along a plurality of lines of bending, which lines extend generally radially of the strip and are spaced apart substantially equal distances in a direction circumferentially of the strip; said lines of bending intersecting the circumferential slots and maintaining the same curvature in the helix during the corrugating.

5. A method of fabricating a packing ring comprising bending a resilient sheet metal strip having a straight edge into helical shape with said edge outwardly, cutting radial slots into the outer portion of said strip, said slots being of uniform length and uniformly spaced apart along the strip, cutting circumferential slots intermediate the edges of the strip to intersect said radial slots thereby subdividing said outer portion into spaced winged ring-segments, said circumferential slots also being of uniform length and having their extremities uniformly spaced apart from one another, corrugating the inner portion of said strip along lines of bending which intersect the ends of the circumferential slots to align said ring-segments in two annular spaced-apart rows in which the ring-segments of one row are parallel to the ring-segments of the other row, and maintaining the same curvature in the helix during the corrugating.

6. A method of fabricating a piston ring comprising bending a resilient sheet metal strip having a straight edge into a helix having approximately two superimposed flat turns, cutting the outer portion of said strip at uniformly spaced-apart points therealong to form uniform T-shaped slots therein, with circumferential and radial portions of the slots subdividing said outer portion of the strip into spaced elongated winged ring segments, and bending the inner uncut portion of said strip at the end of the circumferential portion of said slots along lines of bending which converge to move said ring segments alternately into annular rows which are spaced apart a distance corresponding to the length of the circumferential portions of the T-shaped slots, while maintaining the curvature of the helix and decreasing the length of the strip into a single turn.

7. A method of fabricating a packing ring comprising cutting spaced radial slots in the outer portion of a helically wound flat strip of resilient sheet metal, said strip having its outer edge curved at uniform radius, cutting uniformly spaced apart circumferential slots intersecting said radial slots to subdivide said outer portion into spaced winged ring segments, corrugating the inner portion of said strip to align said ring segments in closely spaced relationship in annular rows which are spaced apart a distance corresponding to the length of the said circumferential slots, and maintaining the same curvature in the helix during the corrugating.

ELMER W. SIEGLING.